United States Patent [19]

Davis

[11] 4,243,241

[45] Jan. 6, 1981

[54] BICYCLE REFLECTOR AND SPLASH GUARD

[76] Inventor: Alden B. Davis, 8022 E. Whitton, Scottsdale, Ariz. 85251

[21] Appl. No.: 76,134

[22] Filed: Sep. 17, 1979

Related U.S. Application Data

[63] Continuation-in-part of Ser. No. 853,288, Nov. 21, 1977, abandoned.

[51] Int. Cl.³ .............................................. B60J 1/68
[52] U.S. Cl. ................................................. 280/158.1
[58] Field of Search ............... 280/154.5 A, 157, 158, 280/158.1

[56] References Cited

U.S. PATENT DOCUMENTS

| | | | |
|---|---|---|---|
| 597,471 | 1/1898 | Nutsford | 280/158.1 |
| 719,608 | 2/1903 | Peterson | 280/158.1 |
| 794,239 | 7/1905 | Maquire | 280/157 X |

FOREIGN PATENT DOCUMENTS

| | | | |
|---|---|---|---|
| 406315 | 1/1910 | France | 280/158.1 |
| 251894 | 2/1927 | Italy | 280/158.2 |
| 227905 | 7/1943 | Switzerland | 280/158.1 |

*Primary Examiner*—John J. Love
*Assistant Examiner*—Norman L. Stack
*Attorney, Agent, or Firm*—Cahill, Sutton & Thomas

[57] ABSTRACT

An arm is pivotally secured to a clamp mounted on a bicycle frame; the arm extends to adjacent the outer periphery of an uncovered wheel. A flat shield of flexible plastic material is molded onto the end of the arm and extends over the wheel. The shield is provided with a cutout therein conforming to the cross-sectional perimeter of the uncovered wheel. A plurality of flexible fingers are molded integrally in the shield and extend into the cutout so that the flexible fingers ride upon the periphery of the wheel as it passes through the cutout in the shield. The arm is pivotal between a guard position, wherein water, dirt and debris thrown by the wheel are deflected from a cyclist operating the bicycle, and a storage position wherein it remains unobtrusive and out of the way so that it does not interfere with the operation of the bicycle. A reflector is molded into one side of the shield to reflect light striking the shield when it is in the storage position.

2 Claims, 5 Drawing Figures

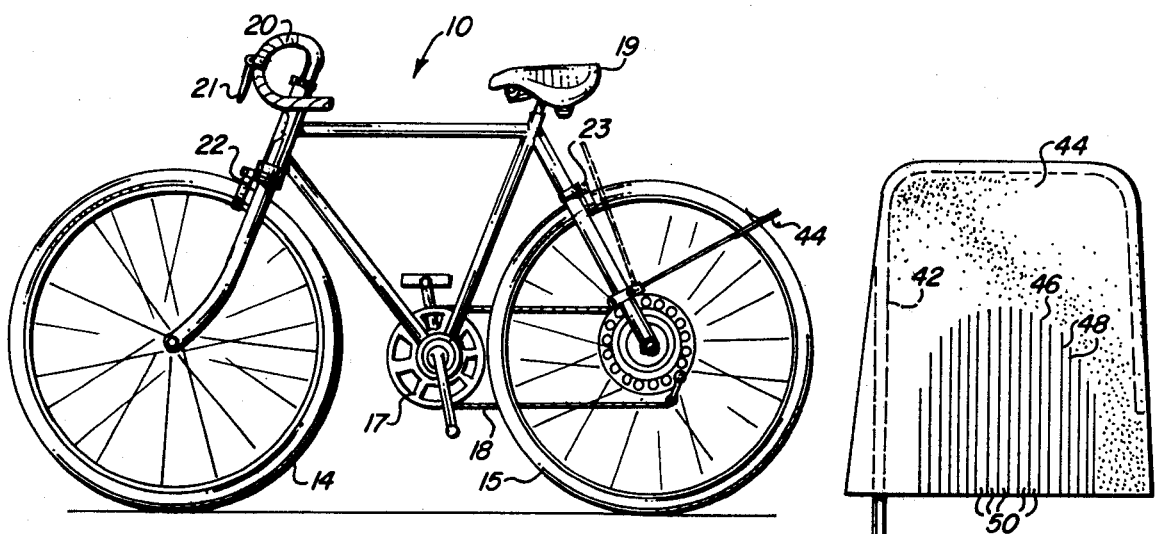
FIG-1
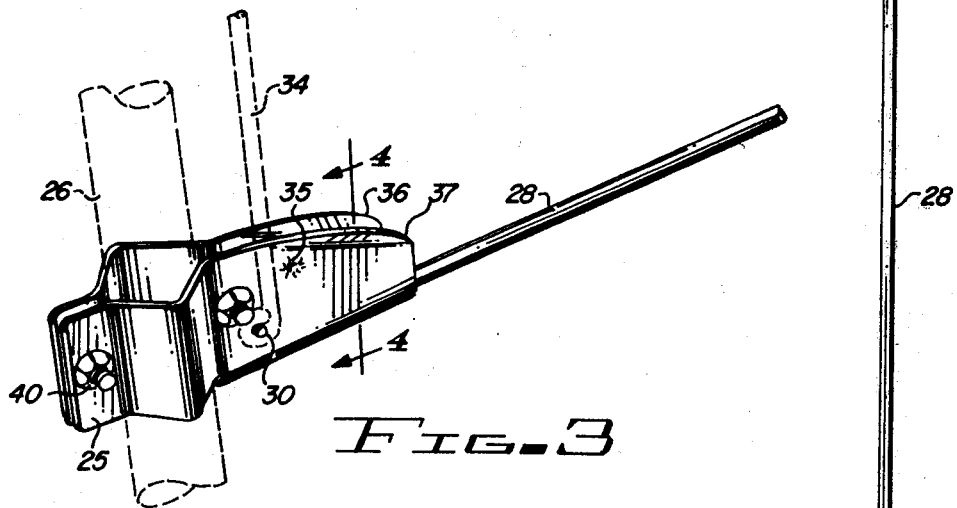
FIG-3
FIG-2
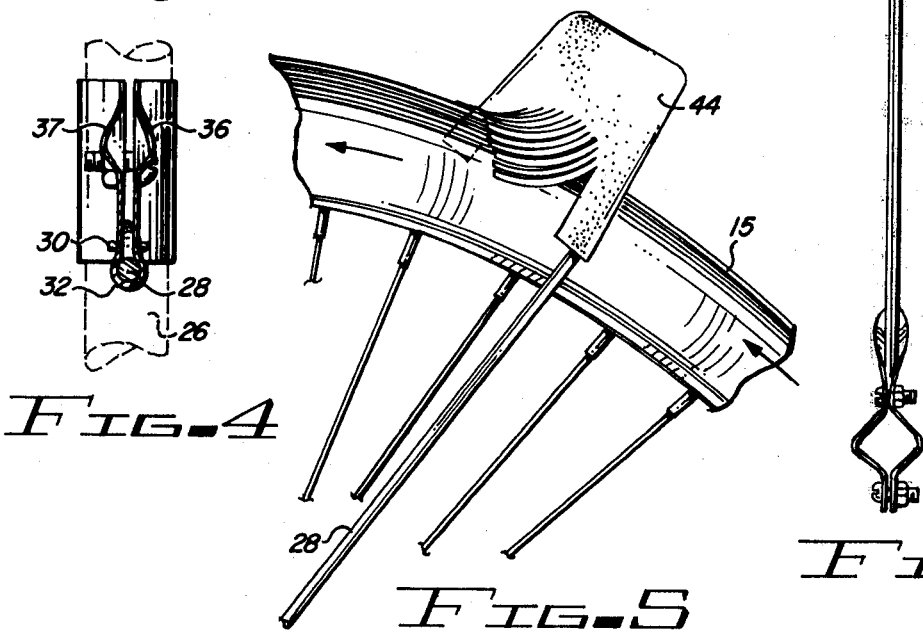
FIG-4
FIG-5

BICYCLE REFLECTOR AND SPLASH GUARD

This application is a continuation-in-part of my copending application, Ser. No. 853,288, filed on Nov. 21, 1977 and entitled "BICYCLE SPLASH GUARD" and now abandoned. The present invention pertains to splash guards, and more particularly, to splash guards for use with bicycles.

Present bicycles, particularly ten-speed or racing bicycles, are extremely lightweight and the design of such bicycles dictates the removal of all unnecessary weight to increase the efficiency of the bicycle. Such bicycles seldom have fenders or other wheel coverings to protect the rider from the bicycle wheel. Ordinarily, in good weather, debris thrown by an uncovered bicycle wheel is quite tolerable and does not interfere with the bicyclist's operation of the bicycle; however, when the road upon which the bicycle is being ridden becomes wet, or mud, oil and puddles of water exist on the road, the dirt and debris thrown upwardly by an uncovered bicycle wheel, particularly the rear wheel, can become quite unpleasant to the cyclist.

Other than to include ordinary fenders, the prior art has attempted to provide protection to the cyclist by covering the top of the rear wheel in a fashion similar to a fender. For example, U.S. Pat. Nos. 509,771 and 868,461 disclose typical mud guards or splash guards incorporating a roll of tape or ribbon that is extended substantially horizontally over the top of the rear wheel of a bicycle. When such guards are not in use, the ribbon or flexible material is rolled up and stored. Such splash guards are relatively heavy and complicated; further, their inherent complexity renders such guards expensive. Further, such splash guards as are shown in the above referenced patents, are of limited effectiveness since the tapes or ribbons are not wide enough to interrupt debris or moisture being thrown from the rotating wheel at an angle to the plane of the wheel.

It is therefore an object of the present invention to provide a splash guard for a bicycle that is extremely light and more effective than guards of the prior art.

It is another object of the present invention to provide a bicycle splash guard that is uncomplicated and can be manufactured less expensively than guards of the prior art.

It is still another object of the present invention to provide a splash guard for use on a bicycle that is lightweight but nevertheless rugged and effective and may be stored unobtrusively and conveniently when not in use.

These and other objects of the present invention will become apparent to those skilled in the art as the description thereof proceeds.

Briefly, and in accordance with the embodiment chosen for illustration, a splash guard is provided having a clamp for securing the guard to the frame of a bicycle adjacent an uncovered wheel. An arm is pivotally secured to the clamp and is positionable between a guard position and a storage position. The arm extends from the clamp to the periphery of the uncovered wheel; the arm also forms the framework for a shield. The arm extends over the wheel in a plane substantially transverse to the plane of the wheel.

A flexible material, such as commonly available vinyl material, is molded on that portion of the arm extending over the wheel; the shield thus formed by the flexible material is provided with a cutout closely conforming to the cross-section of the perimeter of the wheel. The cutout is formed by providing a plurality of slits extending varying distances from the lower edge of the shield to thereby both provide a cutout as aforesaid and to provide a plurality of flexible fingers extending downwardly into the cutout area. The shield is positioned on the arm such that the outer periphery of the uncovered wheel passes through the cutout in contact with the flexible fingers. The arm may be pivoted to a storage position wherein the shield is moved to an unobtrusive location beneath the bicycle seat where it is elevated out of contact with the wheel to insure noninterference with the operation of the bicycle when not in use and wherein an integrally molded reflector is positioned facing the rear of the bicycle.

The present invention may more readily be described by reference to the accompanying drawings, in which:

FIG. 1 shows a bicycle having the splash guard of the present invention mounted thereon.

FIG. 2 is a front elevational view of a splash guard constructed in accordance with the teachings of the present invention.

FIG. 3 is a perspective view of a portion of the splash guard of the present invention showing a clamp in position and showing a portion of the arm extended in a guard position and in a storage position.

FIG. 4 is a cross-sectional view of a portion of FIG. 3 taken along line 4—4.

FIG. 5 is a perspective view of a portion of an uncovered bicycle wheel showing the splash guard of the present invention in position.

Referring now to the drawings, a bicycle 10 is shown having a conventional frame 12 and wheels 14 and 15. A sprocket 17, chain 18, and seat 19 are also provided together with conventional handlebars 20, hand operated brake lever 21 and brake mechanism 22 and 23 for the front and rear wheels, respectively. The bicycle is typical of lightweight ten-speed and racing bicycles which demand lightness to the extent that fenders are omitted. However, as stated previously, when the road is wet and puddles and mud are likely to be encountered, the wheels, and particularly the rear wheel 15, will throw mud, dirt, debris and water onto the cyclist's back. To deflect this material, the present invention is placed in its guard position. A clamp 25 is mounted on a suitable portion 26 of the bicycle frame such that the clamp is positioned adjacent the rear wheel 15. The clamp 25 has a generally U-shaped cross-section to receive an arm 28 pivotally secured at 30 to the clamp; the arm thus may extend in the position shown in FIG. 3 to its guard position or may extend as shown in the broken lines in FIG. 3 to its storage position. When in its guard position, the arm is clamped into the guard position in the channel formed by U-shaped cross-sections and is held by the "pinching" forces exerted by the clamp 25. As may be seen in FIG. 4, the portion 32 of the clamp is rounded in cross-section to form a channel and to generally conform to the diameter of the arm 28 and clamp the arm in its operative position. When the arm is pivoted to its storage position, as shown by the broken lines 34 in FIG. 3, the arm is held through the expediency of a pair of detents such as that shown at 35 formed in the clamp 25; these detents intrude into the pathway of the arm 28 and hold it in its stored position.

The clamp 25 also includes a pair of lips 36 and 37 which facilitate the pivotal movement of the arm 28 and guide the arm to its respective positions in a smooth and uninterrupted manner. The clamp 25 may be secured to the frame member 26 through simple machine bolts and nuts such as that shown at 40.

The arm 28 extends in a plane substantially parallel to the plane of the uncovered wheel 15 and terminates near the outer periphery of the uncovered wheel 15. In the embodiment chosen for illustration, an extension 42 is formed in a hook-shape extending in a plane perpendicular to the plane of the wheel. It may be noted that the extension of 42 is formed of a single metal rod that is used both as an arm and as the hook-shaped portion of 42.

A shield 44, formed of a suitable plastic material, such as flexible vinyl plastic, is molded over the hook-shaped portion 42 and therefore extends in a plane substantially perpendicular to the wheel 15. A cutout 46 is formed in the shield 44 closely conforming to the cross-section of the perimeter of the wheel 15; that is, the curvature of the cutout 46 generally conforms to the cross-sectional shape of the tire mounted on the wheel 15.

The cutout 46 may be formed by cutting a plurality of slits 48 in the shield 44 with each slit having a different length such that a plurality of flexible fingers 50 are formed extending into the cutout area.

The flexible fingers therefore extend into contact with the outer periphery of the uncovered wheel 15 and drag or rub against the tire on the wheel as shown in FIG. 5. While the cutout 46 may closely conform to the cross-section of the perimeter of the uncovered wheel, moisture and debris may nevertheless still escape between the shield and the tire to be thrown onto the back of the cyclist. The flexible fingers 50 extending into the cutout and into contact with the wheel effectively intercept water, mud and debris that otherwise would pass by the shield between the shield and the wheel.

It may be noted that the pivot 30 for the arm 28 is positioned above the axle or the axis of rotation of the wheel 15; therefore, when the arm 28 is moved from its guard position, as shown in solid lines in FIGS. 1 and 3, to its stored position, as shown in broken lines in FIGS. 1 and 3, the shield 44 is automatically moved upwardly away from the outer periphery of the wheel 15. In this stored position, the shield is no longer required and is therefore moved out of contact with the wheel so as not to interfere with the normal operation of the bicycle. Further, in the storage position, the splash guard of the present invention is unobtrusive since the shield portion thereof is positioned closely beneath the seat 19 and the arm 28 lies close to the frame member 26.

A reflector 55 is molded integrally into the shield 44 such that the reflector faces the rear of the bicycle when the arm 28 is in the storage position.

The splash guard of the present invention may thus be left in its storage position until wet pavement or other similar condition requires protection from splashing; at that time, the cyclist need only reach below and behind him and "flip" the splash guard backwardly so that the arm assumes the position shown in solid lines and the shield 44 lowers toward the periphery of the wheel 15. The cutout 46 thus assumes its position in close proximity to the outer periphery of the wheel and the flexible fingers 50 contact the wheel to effectively prevent the passage of water or debris between the shield and the wheel and to effectively deflect the water and debris that is thrown from the wheel as the periphery of the wheel travels upwardly toward the cyclist. The specific shape and size of the shield is not critical; however, it will be understood that the size of the shield (that is, the area) will dictate the protected zone on the back of the cyclist. Therefore, a very small shield will obviously permit some water and debris to be thrown over the shield and strike the cyclist's back; similarly, a very large shield will obviously protect the cyclist but may be so large as to be cumbersome and unattractive. It has been found that sufficient coverage and protection can be obtained through the utilization of a shield measuring approximately $4\frac{1}{2}$ to 5 inches on a side.

I claim:

1. A splash guard for use in a bicycle having a frame and at least one uncovered wheel, comprising:
    a. a clamp, having a U-shaped cross-section, for attachment to the frame of said bicycle, said clamp extending from said bicycle frame to form a channel, and having a detent extending into said channel from at least one side thereof;
    b. an arm pivotally secured at one end to said clamp for pivotal motion between a guard position supported in and in contact with said channel, and a store position maintained at a substantially right angle to said channel by said detents, said arm pivotal in a plane substantially parallel to the plane of said wheel;
    c. said arm including a second end formed into a hook-shaped supporting frame extending in a plane perpendicular to the plane of said wheel, said frame extending over the periphery of said wheel; and
    d. a molded reflecting splash guard having a plurality of flexible fingers molded integrally therewith, said splash guard molded in said frame with said fingers extending into contact with the periphery of said wheel when said arm is in said guard position and out of contact with said wheel when said guard is in said store position, said splash guard having a reflecting portion molded in one side thereof to reflect light striking said splash guard when in the store position.

2. The combination of claim 1 wherein said arm is pivotally secured at a position above the axis of rotation of said one wheel to cause said shield to be moved upward out of contact with said wheel when said arm is positioned in said store position.

* * * * *